(12) United States Patent
Bose et al.

(10) Patent No.: US 7,346,251 B2
(45) Date of Patent: Mar. 18, 2008

(54) LIGHT EMISSION USING QUANTUM DOT EMITTERS IN A PHOTONIC CRYSTAL

(75) Inventors: Ranojoy Bose, Flushing, NY (US); Chee Wei Wong, New York, NY (US); Xiaodong Yang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/405,732

(22) Filed: Apr. 18, 2006

(65) Prior Publication Data
US 2007/0025673 A1   Feb. 1, 2007

Related U.S. Application Data

(60) Provisional application No. 60/672,398, filed on Apr. 18, 2005.

(51) Int. Cl.
*G02B 6/10* (2006.01)
(52) U.S. Cl. ........................ 385/129; 359/332
(58) Field of Classification Search ............. None
See application file for complete search history.

(56) References Cited

U.S. PATENT DOCUMENTS

2002/0191905 A1* 12/2002 Prather et al. ............. 385/24
2003/0013109 A1*  1/2003 Ballinger et al. ............ 435/6
2004/0131097 A1*  7/2004 Deppe et al. ............... 372/45
2006/0147169 A1*  7/2006 Sugita et al. ............. 385/129
2006/0151793 A1*  7/2006 Nagai ........................ 257/79

OTHER PUBLICATIONS

Yasuhiko, A., "Progress and Prospect of Quantum Dot Lasers", 2001, Proceedings of SPIE, vol. 4580, pp. 179 - 185.*

* cited by examiner

*Primary Examiner*—Sung Pak
*Assistant Examiner*—Chad H. Smith
(74) *Attorney, Agent, or Firm*—Wilmer Cutler Pickering Hale and Dorr LLP

(57) ABSTRACT

Devices and methods of manufacturing; for emitting substantially white light using a photonic crystal are described. The photonic crystal has a lattice of air holes and is made from a substrate containing quantum dots. The substrate is etched with three defects that are optically coupled together so that each emits only certain frequencies of light. In combination, the defects can produce substantially white light. The parameters of the photonic crystal are dimensioned so as to cause the coupling between the defects to produce substantially white light.

24 Claims, 10 Drawing Sheets

LIGHT EMISSION USING QUANTUM DOT EMITTERS IN A PHOTONIC CRYSTAL

CROSS-REFERENCE TO RELATED APPLICATIONS

This application claims the benefit under 35 U.S.C. § 119(e) of U.S. Provisional Patent Application No. 60/672,398, filed on Apr. 18, 2005, entitled "White light emission using quantum dot emitters in a photonic crystal slab," which is hereby incorporated by reference herein in its entirety.

BACKGROUND OF THE INVENTION

1. Field of the Invention

The present invention relates to photonic crystals, and more specifically to producing white light from photonic crystals.

2. Description of the Related Art

Photonic crystals (PC's) are materials, such as semiconductors, that prohibit the propagation of light within a frequency bandgap through an artificial periodicity in their refractive index. In two dimensional photonic crystals, a common way to achieve this artificial periodicity is to periodically arrange air holes (i.e., to have a lattice of air holes) in the material making up the photonic crystal (i.e., silicon or GaN).

Photonic crystals may also contain defects (or cavities). These are locations within a lattice of air holes where one or more air holes are not present. These defects may be created using photolithography techniques. Photonic crystals can be seen as an optical analogue of electronic crystals that exhibit bandgaps due to periodically changing electronic potentials. By introducing a defect within a PC, one or more highly localized electromagnetic modes may be supported within the bandgap (analogous to impurity states in solid state devices). These defects greatly modify the spontaneous emission of light from photonic crystals.

SUMMARY OF THE INVENTION

Embodiments of the present invention describe a method of manufacturing a device, and a method of producing substantially white light using a photonic crystal. The photonic crystal has a lattice of air holes and is made from a substrate containing quantum dots. The substrate contains 3 defects that are optically coupled together so that each defect produces only one (or a narrow bandwidth) frequency of light. In combination, these coupled defects can produce substantially white light when the photonic crystal is either optically of electrically pumped.

The photonic crystal is dimensioned so as to cause the optical coupling between the defects to produce substantially white light. These parameters may be determined by using a numerical computation software program such as MIT Photonic Bands (MPB). MPB can be used to compute the resonance modes of coupled defects when given parameters of a photonic crystal.

Embodiments of the present invention contemplate is a method for manufacturing a photonic crystal configured to generate white light. Its substrate is manufactured to include quantum dots, and on this substrate there is fabricated a layer of photonic crystal formed by a lattice of air holes. The lattice of air holes has three defects that are optically coupled together, and dimensioned (in combination with the other dimensions of the photonic crystal) to cause the photonic crystal to produce substantially white light. The defects may be the same size. The parameters of the photonic crystal may be recalculated, if necessary, to cause the photonic crystal to produce substantially white light. The device may also have a cladding layer. One example choice of materials for the photonic crystal is GaN (gallium nitride) for the substrate and InGaN (indium gallium nitride) for the quantum dots. The device may also have a waveguide for guiding the path of the emitted light to an external device.

In various embodiments of the present invention, the photonic crystal can be used to mix a first color of light with a second color of light to produce a third color of light. This example embodiment has only two optically coupled defects instead of three. The defects are disposed and dimensioned to produce two different wavelengths of light that mix together to produce a third wavelength of light. This device may also have a cladding layer and a waveguide.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF EMBODIMENTS OF THE INVENTION

Each embodiment of the present invention described below addresses methods for producing substantially white light using a photonic crystal. Embodiments of the present invention can either operate as a stand alone device for producing white light, or as part of a system that utilizes the output of a stand alone device to achieve other goals.

Defects (cavities) that are located close to each other can become optically coupled as known in the art. The light confined in each defect can interact with other defects through the evanescent part of their wavefunctions. This is analogous to carrier tunneling in semiconductor devices. Accompanied with this coupling is a splitting of the resonant mode into three modes with unique frequencies. The extent of this coupling determines the splitting. The coupling between defects may be used to mix different frequencies of light.

Coupling between defects is based on many factors, including as described above, how close the defects are located to each other. Therefore, the interaction of light between coupled cavities may be affected by changing various parameters of the photonic crystal. For example, parameters of the photonic crystal that may be changed include the size and location of defects, the size and location of air holes, the spacing of the air holes, the thickness of the photonic crystal, the material of the photonic crystal, the material and size of the quantum dots, and others as known in the art.

The effect of changing these parameters may vary. For example, changing the size of air holes located near the defects may change the cavity resonances and shift the bandgaps of those defects. As another example, tuning the defect size changes the frequencies of their cavity modes. Yet another example is that changing the radius of one or more of the air holes between the coupled cavities may change the mode-splitting.

Figure 1A:
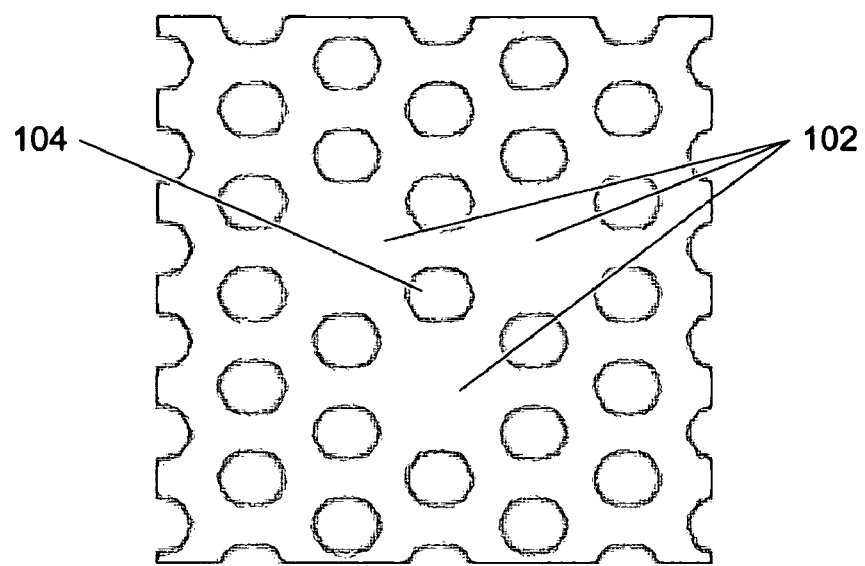
FIG. 1A is a diagram of three triangularly arranged defects and a plurality of holes in accordance with various embodiments of the present invention.

FIG. 1A is a diagram of three triangularly arranged defects and a plurality of holes in accordance with various embodiments of the present invention. The close triangular arrangement of the defects 102 causes them to be coupled. Defects are coupled when any part of the electric field of the mode confined within one defect overlaps with the electric field of the mode confined in another defect. The defects are surrounded by air holes 104 that can affect the coupling between defects 102. Alternatively, the air holes can be filled in with a material, but the refractive index of the material may affect the Q (quality factor) of defects they help define. Further, although the FIG. 1A shows round air holes, the air holes may be created in other geometries, such as, hexagons, octagons, or others having many facets.

Additionally, although only one set of three defects has been shown, a photonic crystal could have an entire array of defect groups (if sufficiently separated to reduce coupling between the groups). Each of these defect groups could then produce white light. Collecting the produced light from these cavities may need to be done individually. This may be done, for example, by using a filter for each group. The filter allows emissions to be collected from only one defect group. An array of defect groups can also be created use multiple substrates, with each substrate containing one or more defect groups.

Figure 1B:
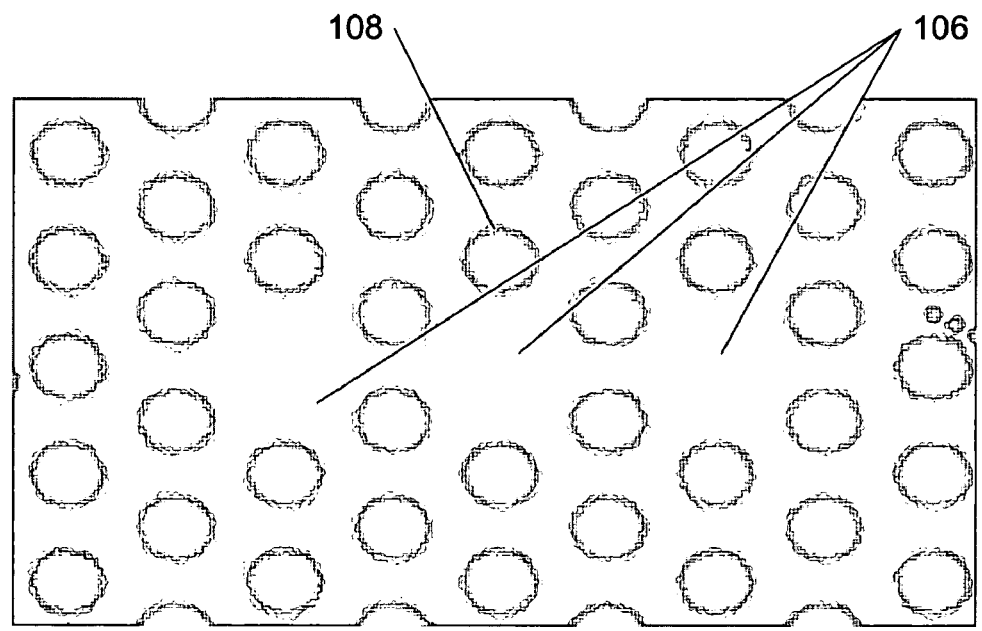
FIG. 1B is a diagram of three linearly arranged defects and a plurality of holes in accordance with various embodiments of the present invention.

FIG. 1B is a diagram of three linearly arranged defects 106 and a plurality of holes 108 in accordance with alternative embodiments of the present invention. Similar to FIG. 1A the close arrangement of the defects 106 causes them to be coupled. However, the different arrangement of the defects results in a different coupling for defects 106 as compared to the defects 102. In both arrangements, the defects are surrounded by air holes.

Figure 2A:
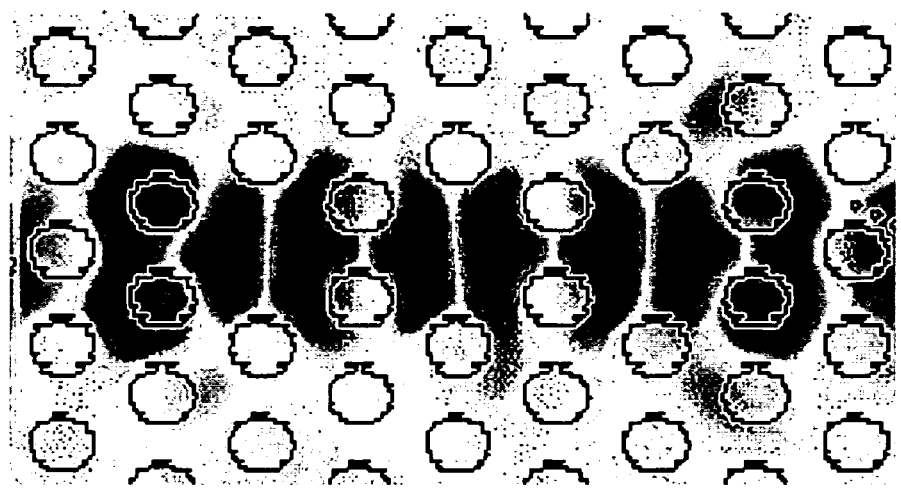
FIG. 2A is an image of an electric field for a linear arrangement of defects, where the normalized frequency of the cavity field mode is 0.382645, in accordance with various embodiments of the present invention.

FIG. 2A is an image of an electric field in a lattice of air holes for a linear arrangement of defects, where the normalized frequency of the cavity field mode is 0.382645, in accordance with various embodiments of the present invention. This image is a result of running a simulation with selected parameters. The simulation was done using software for numerical computation of Maxell's equations called MIT Photonic Bands (MPB). MPB is able to compute the definite-frequency eigenstates of Maxwell's equations in a photonic crystal using a fully-vectorial, three-dimensional algorithm. MPB is further described in S. G. Johnson and J. D. Joannopoulos, Opt. Express, 8, 173 (2001), which is herein incorporated by reference in its entirety. Other numerical computation programs are RSoft developed by the RSoft Design Group Inc, and MEEP (a finite-difference time-domain simulation software package developed at MIT).

Computation can be performed using MPB or other similar tools for a GaN PC, which has a refractive index of approximately 2.4 for visible light. MPB can be used to determine the parameters of the photonic crystal that would produce photon emissions corresponding to a set or desired wavelengths. One set of desired wavelengths is 603 nm, 580 nm, and 559 nm, which correspond to normalized frequencies of the cavity field modes of 0.387039, 0.403035 and 0.418253. Normalized frequencies can be computed from a wavelength by the formula $f=a/ÿ$, where f is the normalized frequency, a is the lattice parameter, and ÿ, is the wavelength. The lattice parameter a defines the center to center spacing between air holes. MPB can be used to compute normalized frequencies of the cavity field modes based on the parameters of a photonic crystal. When the computed normalized frequencies correspond to the desired ones, the photonic crystal parameters have been determined. For example, parameters that may be provided to the MPB program include, the lattice parameter a, the diameter of the air holes, the thickness of the photonic crystal, and the refractive index of the substrate. Other parameters may be determined from a using knowledge commonly known in the art. For example, given a, one estimate for the diameter of the air holes is 0.58a. Similarly, one estimate for the thickness of the photonic crystal is 0.6a. The refractive index of the substrate may be determined from reference sources known to those of skill in the art.

For example, MPB or other similar tools can be used to determine the resonance modes of a set of defects, using for example the value of 234 nm for a lattice parameter a, 133.4 nm (0.58 α) for the diameter of the air holes, 138 nm (0.6 α) for the thickness of the photonic crystal, and ~3.4 for the refractive index (for a GaN substrate). Example computed frequencies can be 0.382645 ($f_1$), 0.391642 ($f_2$), and 0.406326 ($f_3$), which are close to the desired normalized frequencies of the cavity field modes of 0.387039, 0.403035 and 0.418253. Tuning of the photonic crystal parameters can be used to adjust for any deviation between the desired normalized frequencies, and the one obtained from simulation. The above parameters result in three substantially identically sized defects, due to the even spacing of the lattice. However, even though the defects are the same size, because of the coupling between them (which is a function of the photonic crystal parameters) they each have different bandgaps resulting in the emission of different wavelengths.

Figure 2B:
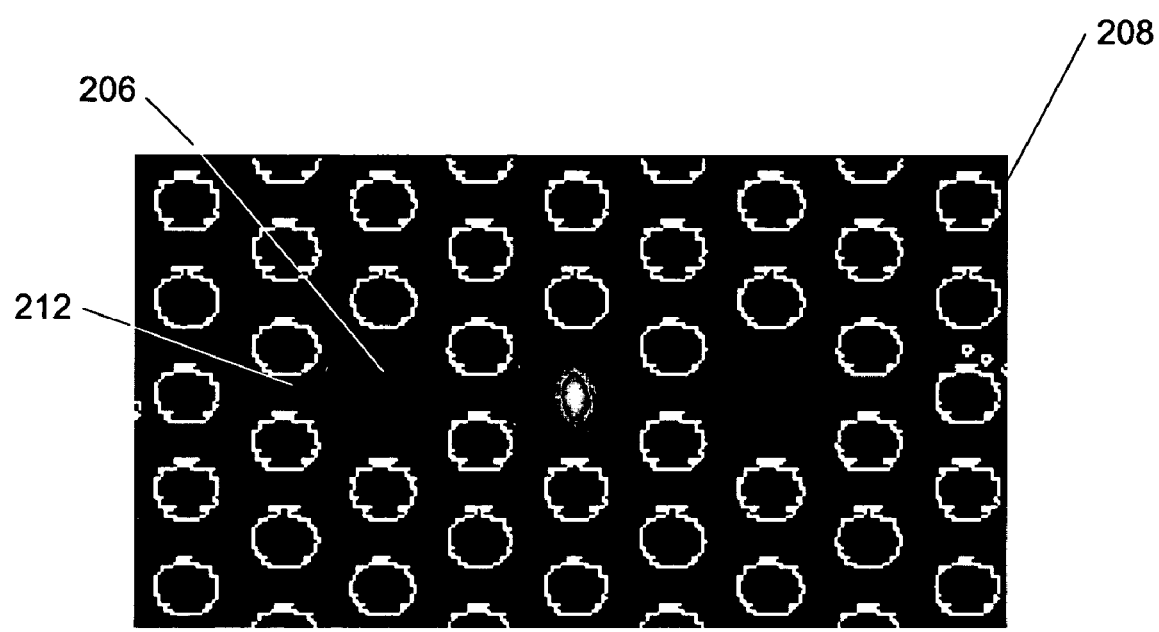
FIG. 2B is an image of the electric field squared, for a linear arrangement of defects, where the normalized frequency of the cavity field mode is 0.382645, in accordance with various embodiments of the present invention.

FIG. 2B is an image of an electric field squared ($|E|^2$), in a lattice of air holes 208 for a linear arrangement of defects for the normalized frequency $f_1$. This image was generated by using MPB with the parameters described above. Higher intensity portions of the electric field are shown by lighter shading 206, while lower intensity portions of the electric field are shown by darker shading 212.

Figure 3A:
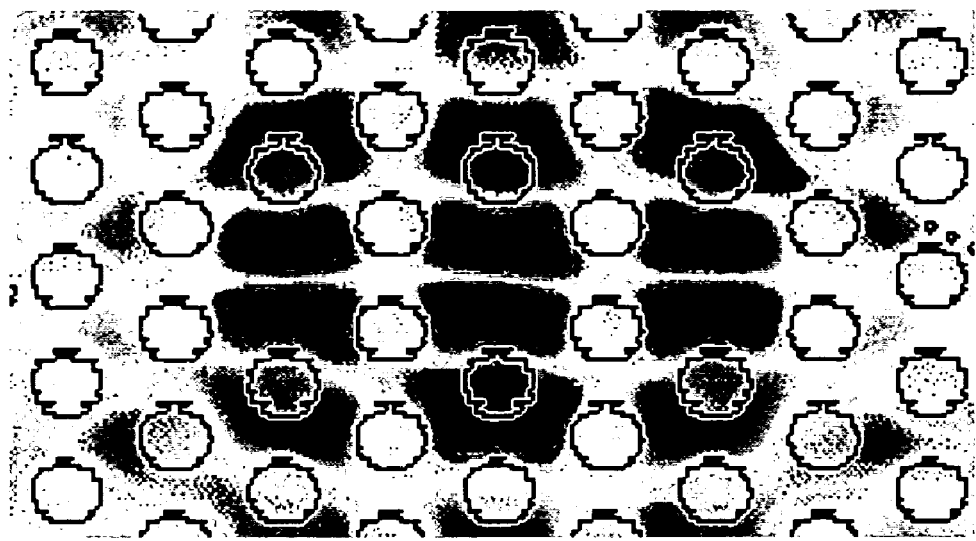
FIG. 3A is an image of an electric field for a linear arrangement of defects, where the normalized frequency of the cavity field mode is 0.391642, in accordance with various embodiments of the present invention.
Figure 3B:
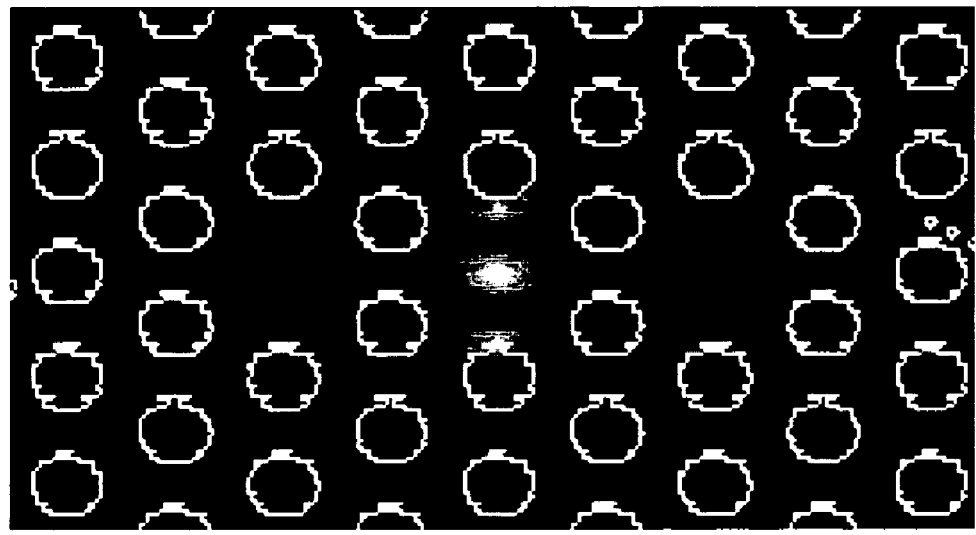
FIG. 3B is an image of an electric field squared, for a linear arrangement of defects, where the normalized frequency of the cavity field mode is 0.391642, in accordance with various embodiments of the present invention.
Figure 4A:
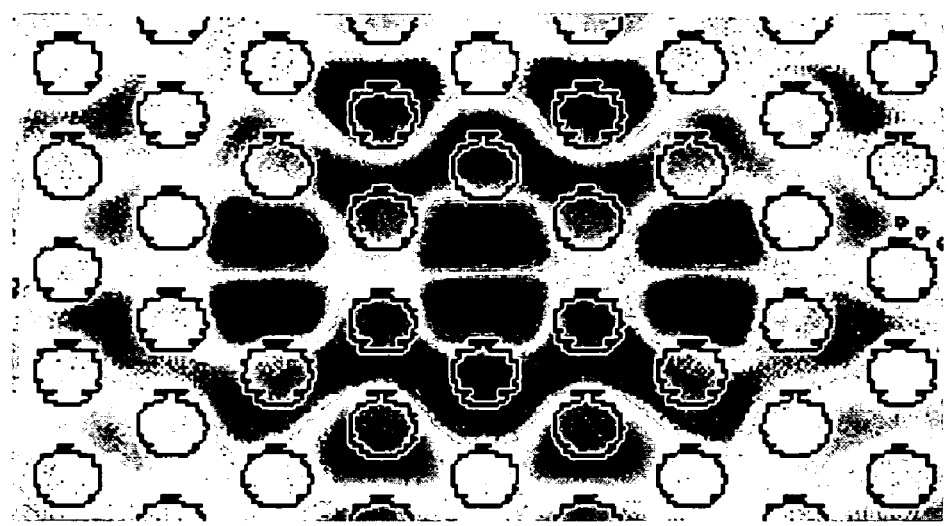
FIG. 4A is an image of an electric field for a linear arrangement of defects, where the normalized frequency of the cavity field mode is 0.406326, in accordance with various embodiments of the present invention.
Figure 4B:
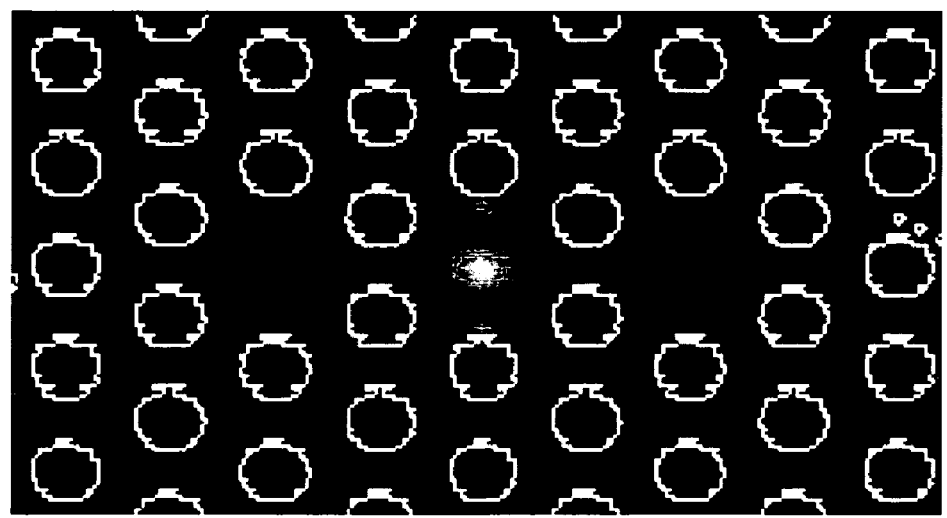
FIG. 4B is an image of an electric field squared, for a linear arrangement of defects, where the normalized frequency of the cavity field mode is 0.406326, in accordance with various embodiments of the present invention.

FIGS. 3A and 4A show an electric field similar to FIG. 2A, except the electric field is shown for defects with normalized frequencies of $f_2$ and $f_3$, respectively. FIGS. 3B and 4B show the absolute value of the electric field squared for normalized frequencies of $f_2$ and $f_3$, respectively, in the same manner as for FIG. 2B.

Figure 5A:
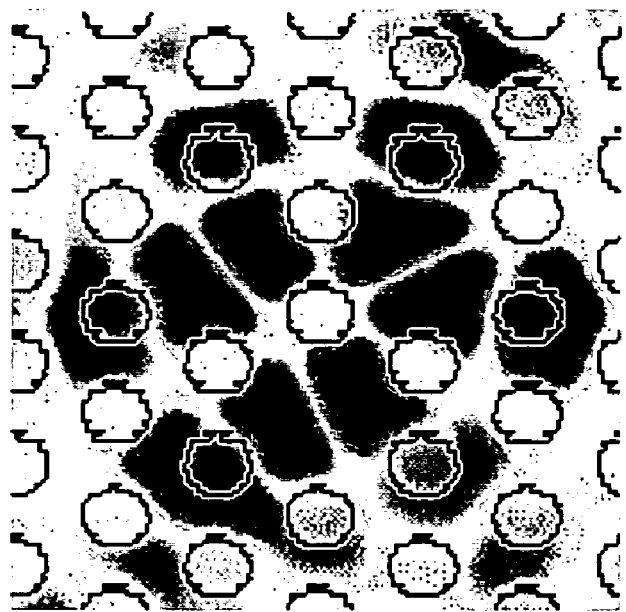
FIG. 5A is an image of an electric field for a triangular arrangement of defects, where the normalized frequency of the cavity field mode is 0.382645, in accordance with various embodiments of the present invention.
Figure 5B:
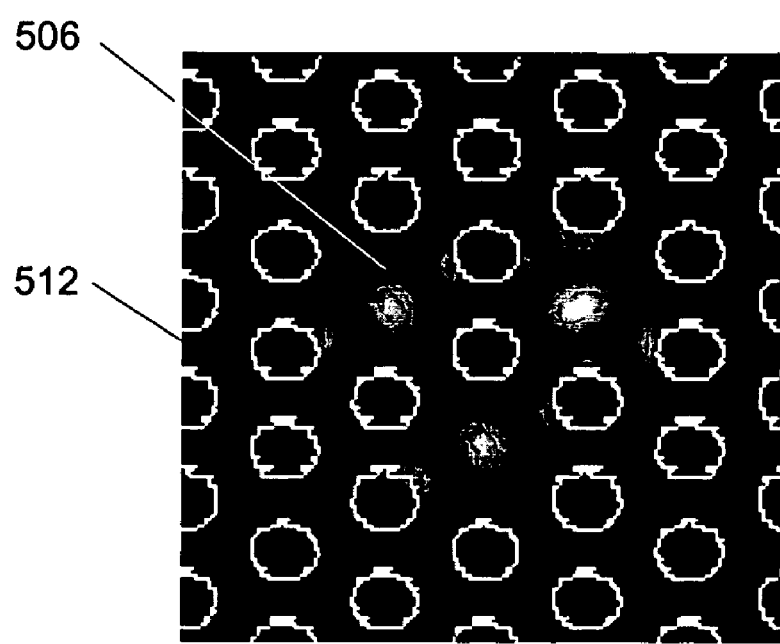
FIG. 5B is an image of an electric field for a triangular arrangement of defects, where the normalized frequency of the cavity field mode is 0.382645, in accordance with various embodiments of the present invention.
Figure 6A:
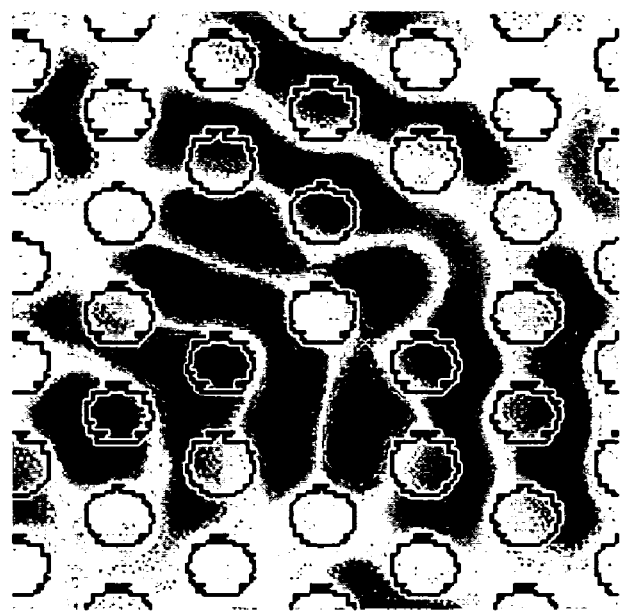
FIG. 6A is an image of an electric field for a triangular arrangement of defects, where the normalized frequency of the cavity field mode is 0.391642, in accordance with various embodiments of the present invention.
Figure 6B:
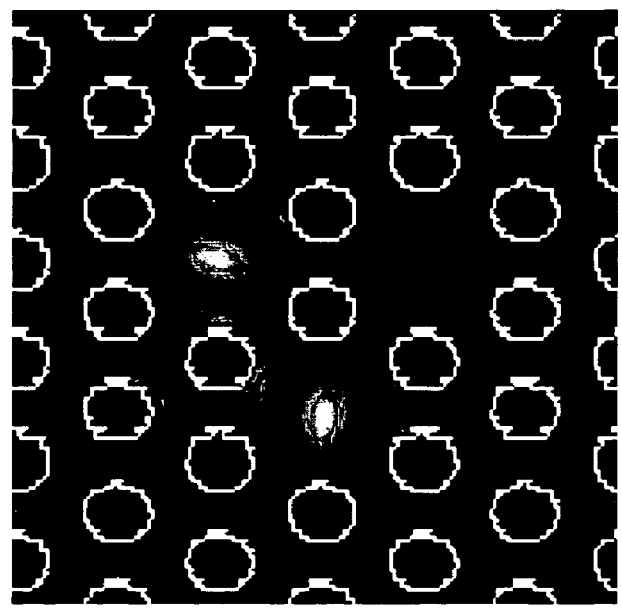
FIG. 6B is an image of an electric field squared, for a triangular arrangement of defects, where the normalized frequency of the cavity field mode is 0.391642, in accordance with various embodiments of the present invention.
Figure 7A:
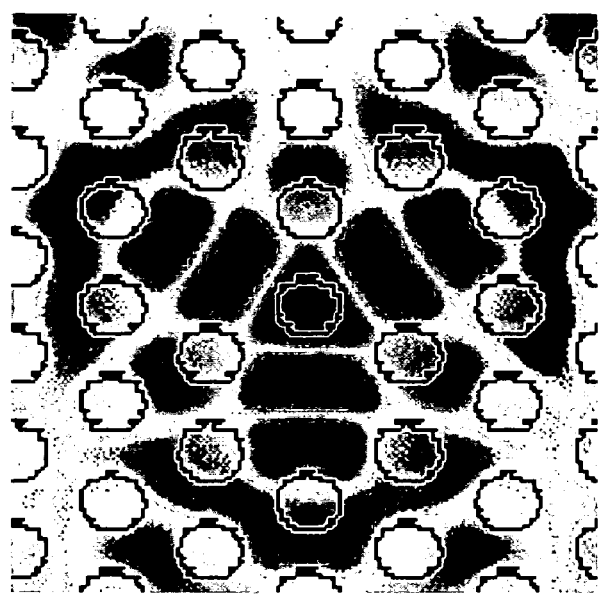
FIG. 7A is an image of an electric field for a triangular arrangement of defects, where the normalized frequency of the cavity field mode is 0.406326, in accordance with various embodiments of the present invention.
Figure 7B:
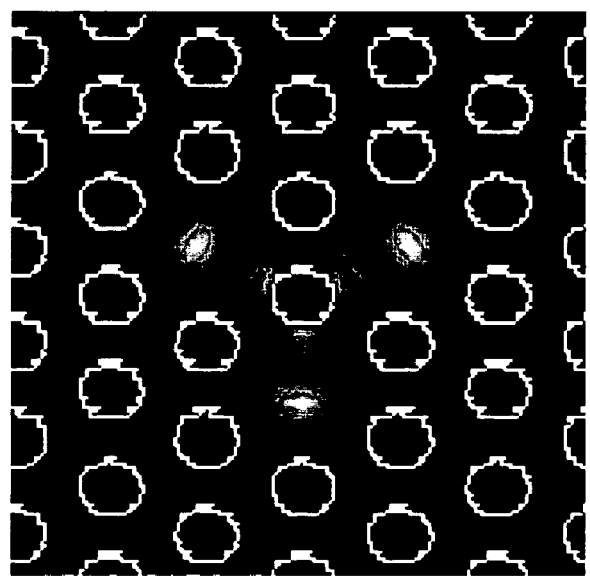
FIG. 7B is an image of an electric field squared, for a triangular arrangement of defects, where the normalized frequency of the cavity field mode is 0.406326, in accordance with various embodiments of the present invention.

As shown in FIG. 1A, the defects 102 may also be coupled when they are arranged triangularly. Using the same parameters as above, MPB or other similar tools can be used to generate an electric field for a triangular arrangement of defects. Images of the electric field for frequencies $f_1$, $f_2$ and $f_3$, respectively, are shown in FIGS. 5A, 6A, and 7A in the same manner as for FIG. 2A. Images for the absolute value of the electric field squared for frequencies $f_1$, $f_2$ and $f_3$, respectively, are shown in FIGS. 5B, 6B, and 7B, in the same manner as for FIG. 2B. For example, higher intensity portions of the electric field are shown by lighter shading 506, while lower intensity portions of the electric field are shown by darker shading 512.

The interaction between cavity fields with matter placed within them is generally explained through the Purcell Effect. For quantum dots placed within PC cavities, a modification of spontaneous emission occurs, with resonant transitions enhanced and off-resonance transitions suppressed. In weak coupling, the spontaneous emission is enhanced by the Purcell enhancement factor:

$$F = 3Q\lambda^3 \epsilon_0 / (4\pi V \epsilon_m)$$

where $E_m$ represents the effective dielectric constant, V represents the effective modal volume, and $\epsilon_0$ is the permittivity of free space. Depending on the confinement of the cavity—given by a quality factor Q—a resonant photon may be emitted and reabsorbed by the quantum dot, resulting in Rabi oscillations in the strong-coupling limit. The quality factor Q is a measure of the lifetime of the energy within the cavity. It may represent the number of periods before the energy within the cavity decays by a certain factor, for example, by $e^{-2n}$. The structure may be modified to increase the Q by changing the defect for enhanced emission. Photonic crystal layers may have quality factors as high as 600,000.

Figure 8:
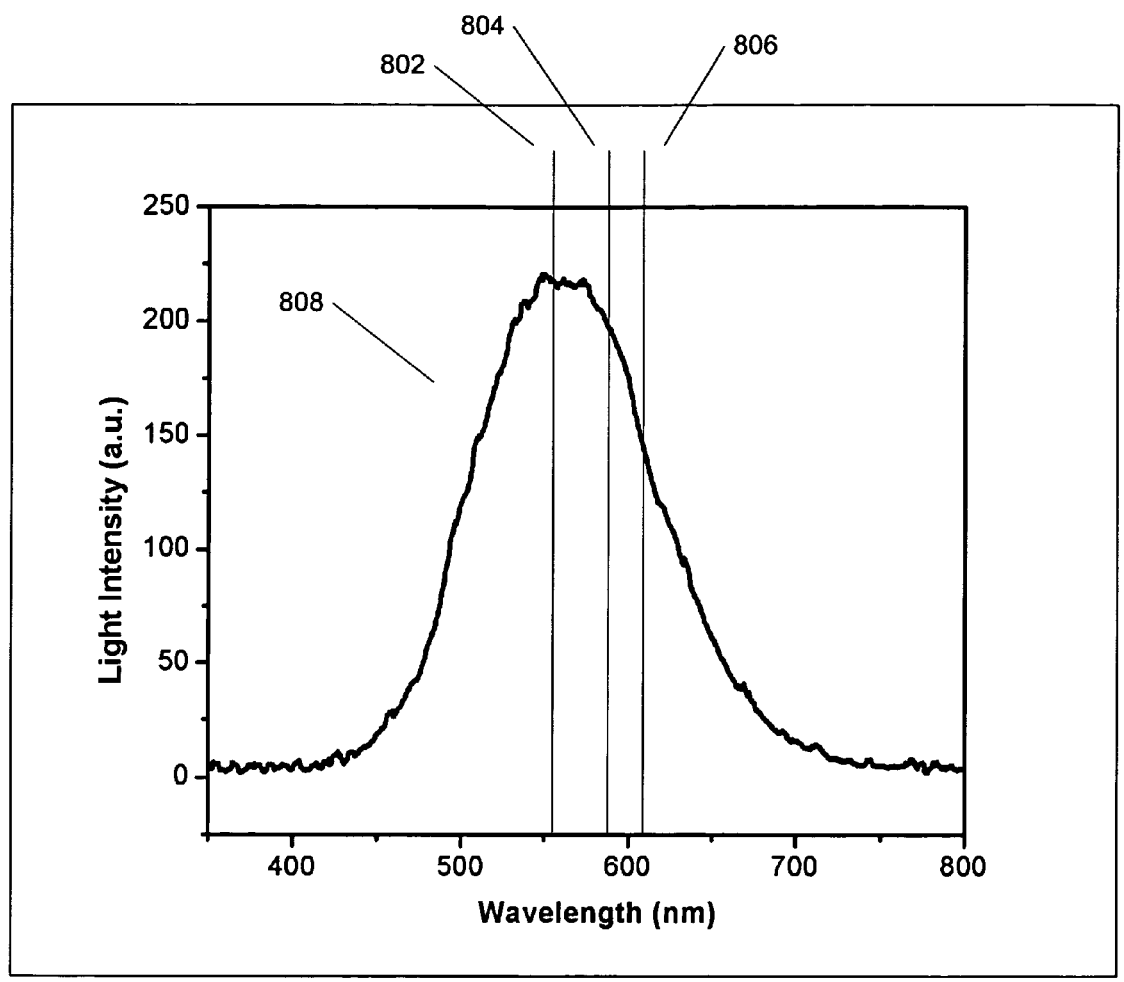
FIG. 8 is a plot of an emission spectrum for InGaN quantum dots on a GaN substrate.

Quantum dots (QDs) are semiconductor nanoparticles that confine charge carriers in 3-dimensions. The electrons and holes reside in highly quantized energy states, and hence the resonant transitions (energy to excite a hole in the valence band across the bandgap to the conduction band) are extremely well defined. To emit light in the visible wavelength, one choice of material for the quantum dots is InGaN, which has its energy bandgap in the visible domain. For an ensemble of InGaN quantum dots grown on a GaN substrate, the quantum dots emit photons at very close optical wavelengths (approximately 480 nm to approximately 650 nm). FIG. 8 is an overall emission spectrum 808 for an ensemble of InGaN quantum dots. The emission spectrum is continuous because the quantum dots vary in size.

When an ensemble of quantum dots is placed within a defect, only certain wavelengths of light will be emitted. These emitted wavelengths depend on the parameters of the photonic crystal. As described above, these parameters can be set so that only the desired wavelengths of light are emitted from the defects. In FIG. 8, these desired wavelengths are shown as the three lines 802, 804, and 806. They correspond to wavelengths of 559 mn, 580 mn, and 603 nm (respectively). A wavelength of 559 nm represents a blue color, a wavelength of 580 nm represents a green color, and a wavelength of 603 represents a red color. The defects cause these emissions to be enhanced, whereas other transitions are inhibited. The combination of emissions at 559 nm, 580 nm, and 603 nm can produce substantially white light if quantum dots that produce the desired wavelengths are present in each of the adjacent defects. When a quantum dot emitting at the desired wavelength is present within a defect, that emission can be enhanced as intended by the parameters of the photonic crystal.

One way of producing a device containing quantum dots within defects is to etch the defects into a substrate already containing quantum dots. This method relies on self-assembly of quantum dots. Using this self-assembly method, a PC can be etched into a GaN substrate containing InGaN quantum dots. This substrate may also be capped with a GaN cladding layer as taught by K. Hennessy et. al., Proc. SPIE, (2004), which is hereby incorporated by reference herein in its entirety. Hennessy et. al. describes capping a cavity to better confine an optical field in order to maximize the strength of coupling between the cavity and a quantum dot. To create the defects, photolithography can be used to etch the lattice of air holes into the substrate. The defects are then created by not etching one or more holes in certain locations. The air holes that surround the locations then create resonance cavities. Alternatively, quantum dots can be deposited on a substrate using a colloidal containing quantum dots. This embodiment can be used to cover the substrate by, for example, spin coating.

Figure 9:
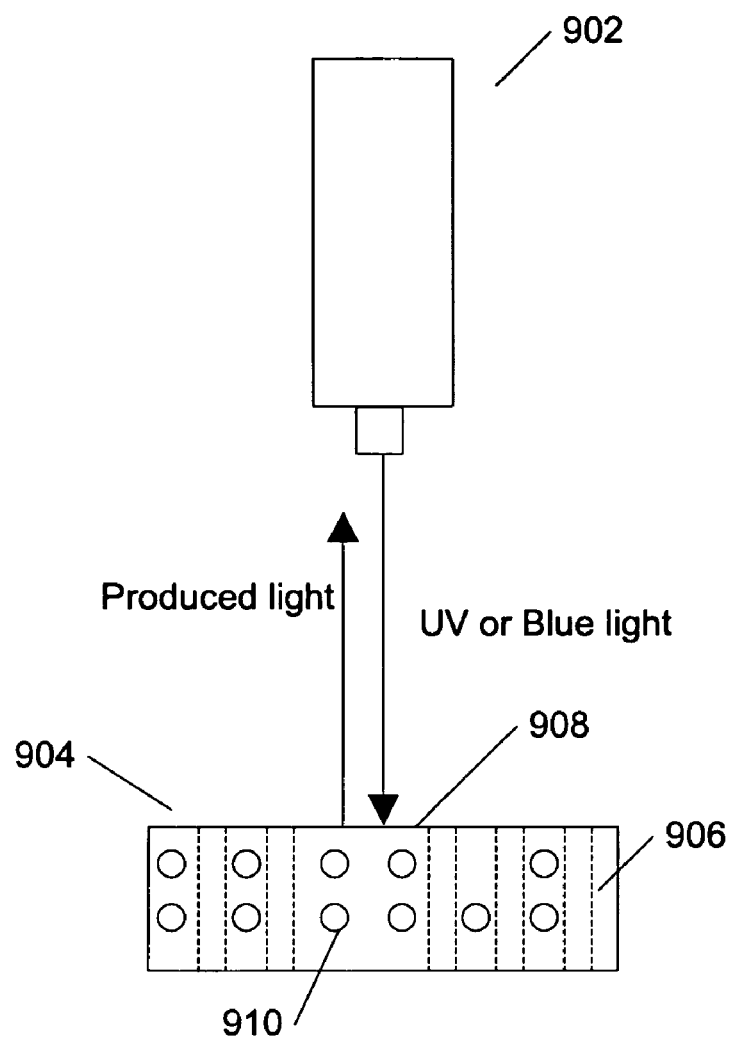
FIG. 9 shows a system for optically pumping a photonic crystal to emit light in accordance with various embodiments of the present invention.

FIG. 9 (not to scale) shows a system for causing a photonic crystal to produce light in accordance with various embodiments of the present invention. A side view of a photonic crystal 904 fabricated with air holes (shown by dotted lines) 906 is shown. A light source 902 can be used to pump the photonic crystal 904 containing quantum dots 910 and defects 908 to produce photons (shown here as the arrow labeled produced light) in the red, green, and blue wavelengths. The light source 902 is typically an ultraviolet (UV) or blue light laser (shown as the arrow pointed towards the photonic crystal 904). It preferably produces photons with at least as much energy (i.e. shorter wavelengths) as any of the frequencies desired to be emitted from the quantum dots. Both UV and blue light lasers are capable of pumping the photonic crystal device to produce red, green, and blue colored photons which can be used to produce white light. The lasers may also be used to pump the quantum dots located within the defects of the photonic crystal device. The light source may be focused on a small area to excite only defects that are located near to each other (i.e., the triangularly arranged defects of FIG. 1A). The laser may be focused using known methods, such as a telescopic lens system. The emitted light from the defects can be measured using the methods discussed in K. Okamoto et. al., Appl. Phys. Lett., 82, 1676 (2003), which is hereby incorporated by reference herein in its entirety. Okamoto et. al. describes a system for observing confined modes and photonic bands of planar photonic crystal cavities. Okamoto et. al. also describes using near field scanning optical microscopy with very small planar photonic cavities. Further, a metal-coated fiber tip is used to distinguish between localized cavity modes and propagating far-field modes. The methods described in Okamoto et. al. may also be used to illuminate the defects. A filter (not shown) may be used to filter out reflected light from the light source 902, if the light source and the detector are located on the same path.

Figure 10:
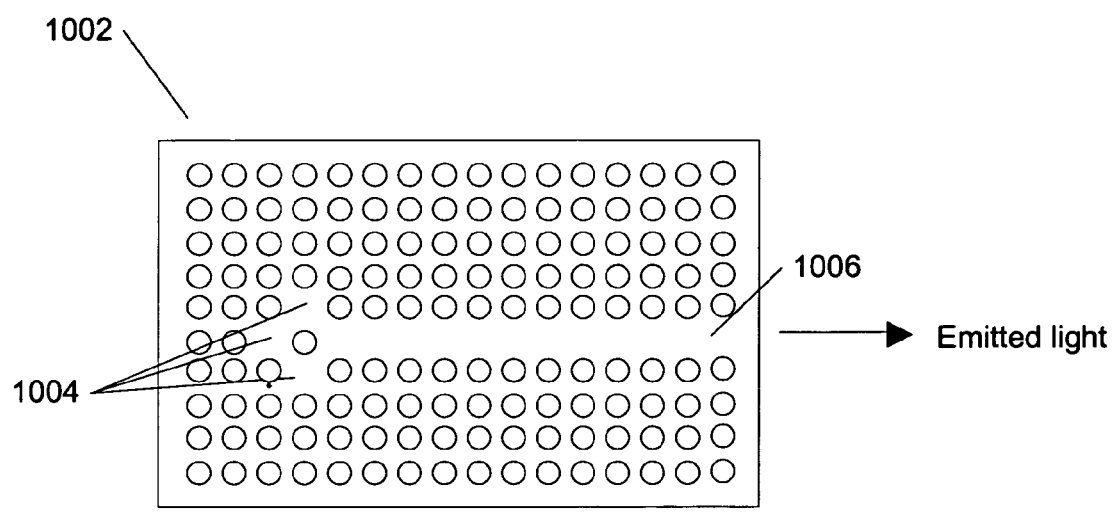
FIG. 10 shows a top view of a photonic crystal that includes a waveguide in accordance with various embodiments of the present invention.

The produced light from the defects would generally be emanating from the same surface of the photonic crystal as from which the photonic crystal was pumped. However, FIG. 10 shows a top view of a photonic crystal 1002 where the light produced from defects 1004 may be redirected using a waveguide 1006. Waveguide 1006 may be created directly onto the substrate, and/or may extend to the end of the substrate to direct the light to other components that may exist in the same system as the photonic crystal.

Alternatively, the defects may be electrically pumped. For example, Park et. al., Characteristics of Electrically Driven Two-Dimensional Photonic Crystal Lasers, IEEE Journal of Quantum Electronics, Vol. 41, No. 9, September 2005, which is hereby incorporated by reference herein in its entirety, describes one method of electrically pumping a photonic crystal cavity. Park et. al. described using a central post placed under a cavity as a first contact, and a metal contact around the cavity as a second contact. Electrically pumping the photonic crystal can result in very similar emissions to those produced by optically pumping. Other methods, that are well known in the art, are also referred to in Park et. al. For example, Zhou et. al., Characteristics of a Photonic Bandgap Single Defect Microcavity Electroluminescent Device, IEEE Journal of Quantum Electronics, Vol. 37, No. 9, September 2001, which is hereby incorporated by reference herein in its entirety, describes etching p and n contacts using optical lithography.

Other embodiments, extensions, and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention, and the entirety of the invention should be regarded so as to allow for such design modifications and future developments within the scope of the present disclosure.

What is claimed is:

1. A method of manufacturing a device, comprising:
   (a) manufacturing a substrate having quantum dots;
   (b) fabricating, from the substrate, a layer of photonic crystal of a predetermined thickness with a lattice of air holes, wherein,
      (i) the lattice of air holes has a predetermined spacing between said air holes;
      (ii) the air holes have predetermined sizes;
      (iii) the lattice of air holes has a first defect with a predetermined size, a second defect with a predetermined size, and a third defect with a predetermined size, wherein the first, second, and third defects are optically coupled to each other; and
      (iv) the thickness of the layer of photonic crystal, the spacing of the lattice of air holes, the sizes of the air holes, the size of the first defect, the size of the second defect, and the size of the third defect are dimensioned to cause the optically coupled defects to emit substantially white light.

2. The method of claim 1, wherein the predetermined thickness is within a range of about 100 nm to about 200 nm, the predetermined spacing is in a range of about 150 nm to about 300 nm, and the predetermined sizes of the air holes are in a range of about 100 nm to about 200 nm.

3. The method of claim 1, wherein the predetermined sizes of the air holes are the same.

4. The method of claim 1, wherein the predetermined size of the first defect is in a range of about 350 nm to about 550 nm, the predetermined size of the second defect is in a range of about 350 nm to about 550 nm, and the predetermined size of the third defect is in a range of about 350 nm to about 550 nm.

5. The method of claim 1, wherein the predetermined size of the first defect, the predetermined size of the second defect, and the predetermined size of the third defect are substantially the same size.

6. The method of claim 1, wherein the predetermined thickness, the predetermined lattice spacing, the predetermined sizes of the air holes, the predetermined size of the first defect, the predetermined size of the second defect, and the predetermined size of the third defect are calculated to cause the layer of photonic crystal to emit substantially white light.

7. The method of claim 1, further comprising fabricating a cladding layer onto the substrate.

8. A device that produces white light, comprising:
   a layer of photonic crystal having a lattice of air holes, wherein,
      (a) the photonic crystal is made from a substrate having quantum dots;
      (b) the lattice of air holes has a first defect with a predetermined size, a second defect with a predetermined size, and a third defect with a predetermined size, wherein the first defect, the second defect, and third defect are optically coupled; and
      (c) the thickness of the layer of photonic crystal, the spacing of the lattice of air holes, the sizes of the air holes, the size of the first defect, the size of the second defect, and the size of the third defect are dimensioned to cause the layer of photonic crystal to emit substantially white light.

9. The device of claim 8, wherein the thickness of the layer of photonic crystal is within a range of about 100 nm to about 200 nm, the spacing of the lattice of air holes is within a range of about 150 nm to about 300 nm, and the sizes of the air holes are within a range of about 100 nm to about 200 nm.

10. The device of claim 8, wherein the sizes of the air holes are all the same.

11. The device of claim 8, wherein the size of the first defect ranges from about 350 nm to about 550 nm, the size of the second defect ranges from about 350 nm to about 550 nm, and the size of the third defect ranges from about 350 nm to about 550 nm.

12. The device of claim 8, wherein the predetermined size of the first defect, the predetermined size of the second defect, and the predetermined size of the third defect are substantially the same.

13. The device of claim 12, further comprising a cladding layer.

14. The device of claim 13, wherein the cladding layer is a semiconductor.

15. The device of claim 8, wherein the substrate is a semiconductor.

16. The device of claim 15, wherein substrate is GaN.

17. The device of claim 8, wherein the quantum dots are made of a semiconductor.

18. The device of claim 17, wherein the semiconductor is InGaN.

19. The device of claim 8, further comprising a structure for changing the path of the emitted substantially white light.

20. The device of claim 19, wherein the structure for changing the path of the emitted light is a waveguide.

21. A device for producing a third color of light that is a mixture of a first color of light and a second color of light, comprising:
   a layer of photonic crystal having a lattice of air holes, wherein,
   (a) the photonic crystal is made from a substrate having quantum dots;
   (b) the lattice of air holes has a first defect of a predetermined size that produces the first color, and has a second defect of a predetermined size that produces the second color, wherein the first defect and the second defect are optically coupled; and
   (c) the thickness of the layer of photonic crystal, the spacing of the lattice of air holes, the sizes of the air holes, the size of the first defect, and the size of the second defect are dimensioned to cause the photonic crystal to emit the third color of light.

22. The device of claim 21, where the thickness of the layer of photonic crystal is within a range of about 100 nm to about 200 nm, and the spacing of the lattice of air holes is in a range of about 150 nm to 300 nm, and the sizes of the air holes are in a range of about 100 nm to about 200 nm.

23. The device of claim 21, wherein the sizes of the air holes are all the same.

24. The device of claim 21, wherein the predetermined size of the first defect is in a range of about 350 nm to about 550 nm, and the predetermined size of the second defect is in a range of about 350 nm to about 550 nm.

* * * * *